United States Patent
Matsubara et al.

(10) Patent No.: US 9,896,740 B2
(45) Date of Patent: Feb. 20, 2018

(54) METHOD FOR OPERATING FLASH VESSEL

(71) Applicant: SUMITOMO METAL MINING CO., LTD., Tokyo (JP)

(72) Inventors: Satoshi Matsubara, Tokyo (JP); Osamu Nakai, Tokyo (JP); Yoji Kyoda, Tokyo (JP); Takashi Sakamoto, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 694 days.

(21) Appl. No.: 14/370,841

(22) PCT Filed: Dec. 27, 2012

(86) PCT No.: PCT/JP2012/083947
§ 371 (c)(1),
(2) Date: Jul. 7, 2014

(87) PCT Pub. No.: WO2013/105453
PCT Pub. Date: Jul. 18, 2013

(65) Prior Publication Data
US 2015/0044112 A1    Feb. 12, 2015

(30) Foreign Application Priority Data
Jan. 13, 2012   (JP) ................. 2012-005441

(51) Int. Cl.
*C22B 3/00* (2006.01)
*C22B 3/02* (2006.01)
(Continued)

(52) U.S. Cl.
CPC ............ *C22B 23/0415* (2013.01); *B01J 3/04* (2013.01); *B01J 4/008* (2013.01); *C22B 3/02* (2013.01);
(Continued)

(58) Field of Classification Search
None
See application file for complete search history.

(56) References Cited

U.S. PATENT DOCUMENTS

| 5,052,426 A | 10/1991 | Kasper |
| 2004/0050212 A1* | 3/2004 | Cheng ................. C22B 3/0024 75/722 |
| 2010/0028227 A1 | 2/2010 | Shibayama et al. |

FOREIGN PATENT DOCUMENTS

| JP | H09218072 A | 8/1997 |
| JP | 1080700 | * 3/1998 |

(Continued)

OTHER PUBLICATIONS

Jun. 16, 2015 Extended European Search Report issued in Application No. 12864964.7.
(Continued)

*Primary Examiner* — Melissa S Swain
(74) *Attorney, Agent, or Firm* — Oliff PLC

(57) ABSTRACT

The present invention is such that, with H1 being the height from a slurry outlet to a control liquid level, H2 being the height from the control liquid level to the top of a flash vessel, and being the diameter of the flash vessel, $0.35D \leq H1 \leq 0.45D$, and $0.75D \leq H2 \leq 0.85D$, and at least one liquid level sensor detects a slurry liquid surface at a control liquid level; when the liquid level sensor detects a slurry liquid surface which has risen, a slurry discharge valve installed on a slurry discharge pipe derived from the flash vessel is opened; and when the liquid level sensor detects a slurry liquid surface which has fallen, the slurry discharge valve is closed, whereby opening and closing of the valve is appropriately controlled thereby to reduce troubles with a steam discharge pipe, the slurry discharge pipe, and the slurry discharge valve.

2 Claims, 5 Drawing Sheets

(51) Int. Cl.
*C22B 3/04* (2006.01)
*B01J 3/04* (2006.01)
*B01J 4/00* (2006.01)

(52) U.S. Cl.
CPC ....... *C22B 3/04* (2013.01); *B01J 2219/00182* (2013.01); *Y02P 10/234* (2015.11)

(56) References Cited

FOREIGN PATENT DOCUMENTS

| | | |
|---|---|---|
| JP | A-10-080700 | 3/1998 |
| JP | H1080700 A | 3/1998 |
| JP | A-2009-524797 | 7/2009 |
| JP | A-2010-031341 | 2/2010 |
| JP | A-2010-059489 | 3/2010 |
| JP | A-2010-164223 | 7/2010 |
| WO | 2011041873 A1 | 4/2011 |

OTHER PUBLICATIONS

Mar. 26, 2013 International Search Report issued in International Application No. PCT/JP2012/083947 (with translation).

* cited by examiner

METHOD FOR OPERATING FLASH VESSEL

FIELD OF THE INVENTION

The present invention relates to a method for operating a flash vessel, specifically relates to a method for operating a flash vessel (a vessel for reducing temperature and pressure) in a high-pressure acid leaching process, the high-pressure acid leaching process being such that a raw material slurry is leached by using an autoclave (high-pressure reaction vessel) under high temperature and high pressure, and then the temperature and pressure of a leached slurry is reduced to normal temperature and pressure by using the flash vessel. The present application asserts priority rights based on JP Patent Application 2012-005441 filed in Japan on Jan. 13, 2012. The total contents of disclosure of the Patent Application of the senior filing date are to be incorporated by reference into the present Application.

BACKGROUND OF THE INVENTION

In recent years, with the development of a material having corrosion resistance under high temperature and high pressure as a backdrop, high pressure acid leaching with sulfuric acid has been attracting attention as hydrometallurgy of nickel oxide ores (for example, refer to Patent Literature 1). Unlike pyrometallurgy, which is a conventional common method for smelting nickel oxide ores, the high pressure acid leaching does not comprise pyrometallurgical processes, such as reduction and drying, but comprises an integrated hydrometallurgical process, and thus is advantageous in terms of energy and cost. In other words, the above-mentioned high-pressure acid leaching has a great advantage because, in a leaching process, the oxidation reduction potential and temperature of a leachate in a pressure leaching reactor are controlled, thereby fixing iron, a main impurity, to a leaching residue in the form of hematite ($Fe_2O_3$), whereby nickel and cobalt can be selectively leached over iron.

For example, as hydrometallurgy of nickel oxide ores, high-pressure acid leaching by using an autoclave has been adopted, wherein, in a high-pressure acid leaching process in which that a raw material slurry is leached by using an autoclave under high temperature and high pressure and then the temperature and pressure of the leached slurry is reduced to normal temperature and pressure by using the flash vessel, a liquid level in the flash vessel is usually measured by a sensor directly attached to the flash vessel.

Here, as shown in FIG. 5 illustrating a schematic structure of a common flash vessel 100, the flash vessel 100 comprises a body portion 101 in the form of a closed-bottom cylinder; a slurry inlet 103 and a steam outlet 105 are provided at a ceiling portion 102 which closes the open upper part of the body portion 101; and a slurry outlet 104 is provided at the body portion 101. A slurry feeding pipe 113 configured to feed a leached slurry of which the temperature and pressure is reduced to a predetermined temperature and a predetermined pressure (hereinafter, sometimes simply referred to as a slurry) into the flash vessel 100 is coupled to the above-mentioned slurry inlet 103. A slurry discharge pipe 114 configured to discharge the slurry fed into the flash vessel 100 is coupled to the above-mentioned slurry outlet 104. A steam discharge pipe 115 configured to recover steam which is generated inside the flash vessel 100 with feeding of the slurry is coupled to the above-mentioned steam outlet 105. A slurry discharge valve 116 is attached to the slurry discharge pipe 114 coupled to the slurry outlet 104.

Furthermore, a leached slurry of which the temperature and pressure is reduced to a predetermined temperature and a predetermined pressure (hereinafter, sometimes simply referred to as a slurry) is fed into this flash vessel 100 via the slurry inlet 103, and the slurry fed into the flash vessel 100 is discharged from the slurry outlet 104, meanwhile steam which is generated with the feeding of the slurry is discharged from the steam outlet 105.

At this time, measurement results of a liquid level in the flash vessel measured by liquid level sensors 120A and 120B are used to keep a liquid level in the flash vessel 100 at a proper liquid level.

For example, in the case where a liquid level is measured with the liquid level sensors 120A and 120B which are installed at upper and lower limits of the liquid level, respectively, when a liquid level has risen and the liquid level sensor 120A installed at the upper liquid level limit detects the liquid level accordingly, the above-mentioned slurry discharge valve 116 is opened to discharge a slurry remaining in the flash vessel 100, whereas when a liquid level had dropped to the extent that the liquid level sensor 120B installed at the lower liquid level limit cannot detect the liquid level, the above-mentioned slurry discharge valve 116 is closed to stop discharging of a slurry from the flash vessel 100. Consequently, a slurry liquid level in the flash vessel 100 is controlled to be between the above-mentioned upper and lower limits. Furthermore, in the case where a liquid level is continuously measured, when a liquid level rises to be higher than a control liquid level, the slurry discharge valve 116 is opened wider, whereby the discharge amount of a slurry remaining in the flash vessel 100 is increased, whereas, when a liquid level falls to be lower than the control liquid level, the slurry discharge valve 116 is opened smaller, whereby discharging of a slurry from the flash vessel 100 is controlled.

Generally, a leaching reaction in the above-mentioned high-pressure acid leaching process is controlled by, other than temperature, a control factor (pH, oxidation-reduction potential) of the leaching reaction by using a leaching agent. For example, a leaching method using chlorine gas as a leaching agent is performed by using an oxidation-reduction potential in a leachate, and therefore a pressure in an autoclave is not directly controlled, and not stable or fixed during leaching operation, and it varies depending on injection amount of chlorine gas which is controlled by the oxidation-reduction potential.

In the case where a leaching agent is a liquid and no gas is generated by a reaction, generally, a pressure in an autoclave is produced by saturated vapor pressure depending on temperature. For example, in recent years, high-pressure acid leaching by using an autoclave has been adopted as hydrometallurgy of nickel oxide ores in order to recover valuable metals, such as nickel and cobalt.

According to the above-mentioned high-pressure acid leaching, for example, in an ore treatment process, an ore slurry having a predetermined slurry concentration and containing ores having a size of 2 mm or less is first prepared by using an pulverizing apparatus and a sieving apparatus. Then, the above-mentioned ore slurry is fed into a high-pressure acid leaching process. Here, the above-mentioned ore slurry is gradually heated and pressurized with a pre-heater (an apparatus to increase temperature and pressure), and then fed into an autoclave. In the autoclave, impurity elements, such as iron, aluminum, and zinc, as well as nickel and cobalt which are contained in the ores are partly leached with sulfuric acid, whereby a leached slurry containing these is obtained. Subsequently, the above-mentioned leached slurry is transferred from the autoclave to a flash vessel configured to reduce the temperature and pressure of the leached slurry to normal temperature and pressure, and the temperature and pressure of the leached shiny is gradually reduced. After that, the leached slurry goes through a preneutralization process for neutralizing free sulfuric acid in a leachate, a solid-liquid separation process by using thickeners with a multi-stage type, and the like, thereby being separated into a leaching residue and a leachate.

Here, the adoption of the flash vessel in the above-mentioned high-pressure acid leaching process fills a gap between an operating condition of an autoclave in the high-pressure acid leaching process and an operating condition of the subsequent process. In other words, as a leaching condition of the autoclave, a temperature of approximately 200 to 300 degrees C. is usually selected in order to achieve a high leaching rate of nickel and cobalt. On the other hand, from a safety and economic standpoint, the subsequent preneutralization process or solid-liquid separation process is usually operated under atmospheric pressures. Therefore, while gradually recovering pressurized steam from a leached slurry having a high temperature and a high pressure, a flash vessel reduces the temperature and the pressure of the leached slurry.

Here in the high-pressure acid leaching process, a very expensive pipe which is made of a material and has a structure to be resistant to high temperature and pressure is used as a pipe to transfer the leached slurry from the autoclave to the flash vessel, a pipe to supply the above-mentioned recovered steam to the preheater for the ore slurry, a pipe to gradually increase the temperature and pressure of the ore slurry, and the like; and, based on requests concerning overall costs including materials costs, piping is made short as much as possible and each equipment is appropriately arranged. Thus, the leached slurry is transferred from the autoclave to a first-stage flash vessel, and further transferred to another subsequent-stage flash vessel one by one. Here, as a method for transferring the leached slurry between the flash vessels, not a mechanical transfer method like a pump, but a method of transferring the slurry by making use of a height difference between positions of installing flash vessels and a pressure difference between each stage is usually adopted. This is because sulfuric acid is contained in the leached slurry and thus durability and costs of transfer equipment have been taken into consideration. For example, in a practical plant, in the case where an autoclave having a size of approximately 4 to 6 m in diameter and approximately 25 to 30 m in length and having a cylindrical shape is horizontally installed, the first-stage flash vessel is installed at a position located at approximately 25 to 35 m height above the autoclave.

The pressurized steam gradually recovered from the leached slurry having a high temperature and a high pressure is fed into a preheater having the same level of a temperature and pressure as those of the slurry from each stage of the flash vessels, and, as mentioned above, also for this piping here, a very expensive pipe which is made of a material and has a structure to be resistant to high temperature and high pressure is provided.

However, problems about the occurrences of damage and the like to the steam discharge pipe, the slurry discharge pipe and the slurry discharge valve have not been completely solved out, and approximately ten occurrences of damage to the steam discharge pipe and the slurry discharge valve have taken place per year operation, and therefore a practical technique to further reduce the problems about the occurrence of damage has been required.

A cause about the above mentioned damages is presumed to lie in insufficient control of liquid level. In other words, at the time when a leached slurry having a high temperature and a high pressure is fed into a flash vessel and steam is generated accordingly, a liquid surface of the slurry is presumed not to be flat, or rather, it is presumed that steam generated from a deep part of the slurry causes a liquid level thereof to violently vary, whereby the control of the liquid level is insufficient.

In other words, there is only the above-mentioned presumption because, in the high-pressure acid leaching process adopted as hydrometallurgy of nickel oxide ores and using an autoclave, a flash vessel configured to reduce the temperature and pressure of a slurry obtained after leaching a raw material slurry under high temperature and high pressure by using an autoclave has a large size and furthermore is to be applied to a strongly acidic slurry, and therefore it is technically hard to provide an observation window to the flash vessel, and therefore it is substantially impossible to visually observe the inside of the flash vessel.

The conventional flash vessel 100 may have a problem that, for example, even if a liquid level is actually high, the liquid level sensor 120A installed at the upper limit liquid level cannot detect the liquid level due to violent fluctuation of a liquid surface, and the slurry discharge valve 116 does not control the liquid level accordingly, whereby operation continues to be performed in such a state that the liquid level in the flash vessel 100 is high, and accordingly an acidic slurry is transferred together with recovered steam to a preheater, and due to the acidic slurry corrosion of the recovered steam discharge pipe 115 is advanced. On the other hand, the prior flash vessel 100 may have another problem that, even if a liquid level is actually low, similarly the liquid level sensor 120B installed at the lower limit liquid level cannot detect the liquid level accordingly, and the shiny discharge valve 116 does not control the liquid level, whereby the liquid level actually becomes lower than the position of the slurry discharge pipe 114, and steam in the flash vessel 100 is discharged together with a discharged slurry from the slurry discharge pipe 114 to the subsequent-stage flash vessel, whereby a flow rate of the slurry in the discharge pipe is made temporarily higher, thereby causing damages of the slurry discharge pipe 114 and the valve, and the amount of steam flowing from the subsequent-stage flash vessel to the recovered steam pipe is temporarily increased, thereby causing a more amount of the acidic slurry to be transferred, or the increase in the flow rate causes corrosion and wear of the recovered steam pipe to advance.

For example, Patent Literature 2 discloses a method for condensing a slurry of organic sludge, wherein a liquid surface in a flash vessel is detected, whereby the liquid level of a condensed liquid is always kept higher than the position of an outlet. However, the method is hard to directly apply to solve the above-mentioned problems because conditions are too different, that is, a target to be treated is a slurry of organic sludge, the steam pressure is 2.5 atmospheres at most, and the like.

Furthermore, for example, Patent Literature 3 discloses a technique for controlling the refrigerant charge into a refrigerant vapor compression system by use of at least one sensor which detects the level of a liquid refrigerant in a flash vessel used for the system, but the technique is used for a float type sensor, a supersonic sensor, or the like as a sensor, and accordingly is applicable only when a liquid surface is flat, and hence the technique is hard to apply to solve the above-mentioned problems.

PRIOR-ART DOCUMENTS

Patent Document

PTL 1: Japanese Patent Application Laid-Open No. 2010-059489
PTL 2: Japanese Patent Application Laid-Open No. H10-080700
PTL 3: Japanese Translation of PCT International Application Publication No. 2009-524797

SUMMARY OF THE INVENTION

In view of the above-mentioned problems in the prior arts, the present invention aims to provide a method for operating a flash vessel, the method being such that, in a high-pressure acid leaching process wherein a raw material slurry is leached by using an autoclave under high temperature and high pressure and then the temperature and pressure of a leached slurry is reduced to normal temperature and pressure by using the flash vessel, a predetermined upper limit and a predetermined lower limit of the liquid level of the slurry in the flash vessel are determined by a relation between the height of a slurry outlet and the diameter of a flash vessel main body and a relation between the height and the diameter of the flash vessel main body, whereby opening and closing valve is sufficiently controlled, thereby allowing troubles of a steam discharge pipe, a slurry discharge pipe, and a slurry discharge valve to be reduced. Other objects of the present invention and specific advantages achieved by the present invention will become further apparent from the description of examples hereinafter.

In order to achieve the above-mentioned objects, the inventors earnestly have studied control of the liquid level of a flash vessel in a high-pressure acid leaching process wherein a raw material slurry is leached by using an autoclave under high temperature and high pressure and then the temperature and pressure of a leached slurry is reduced to normal temperature and pressure by using the flash vessel. As a result, the inventors found that, when a predetermined control liquid level of the slurry in the flash vessel was determined by a relation between the height from a slurry outlet to a control liquid level and the diameter of the flash vessel and a relation between the height from the control liquid level to the top of the flash vessel and the diameter of the flash vessel, troubles of a steam discharge pipe, a slurry discharge pipe, and a slurry discharge valve was able to be reduced, and thus the present invention was accomplished.

In other words, the present invention provides a method for operating a flash vessel in a high-pressure acid leaching process, the high-pressure acid leaching process being such that a raw material slurry is leached using an autoclave under high temperature and high pressure and then the temperature and pressure of a leached slurry is reduced to normal temperature and pressure using the flash vessel, wherein, with H1 being the height from a shiny outlet to a control liquid level, H2 being the height from the control liquid level to the top of the flash vessel, and D being the diameter of the flash vessel, $0.35D \leq H1 \leq 0.45D$,
$0.75D \leq H2 \leq 0.85D$, and at least one liquid level sensor detects a slurry liquid surface at the control liquid level, and wherein, when the liquid level sensor detects a slurry liquid surface which has risen, a slurry discharge valve installed on a slurry discharge pipe derived from the flash vessel is opened, meanwhile, when the liquid level sensor detects a slurry liquid surface which has fallen, the slurry discharge valve is closed.

A method for operating a flash vessel according to the present invention is such that, for example, at least one liquid level sensor installed at the equivalent level to the above-mentioned control liquid level detects a liquid surface in a hydrostatic tower whose lower part is communicated with a liquid phase space of the flash vessel meanwhile whose upper part is communicated with a gas phase space thereof; and when the liquid level sensor detects a liquid surface which has risen in the hydrostatic tower, a slurry discharge valve installed on a slurry discharge pipe derived from the flash vessel is opened, meanwhile, when the liquid level sensor detects a liquid surface which has fallen in the hydrostatic tower, the slurry discharge valve is closed.

Furthermore, the method for operating the flash vessel according to the present invention is characterized in that, for example, the above-mentioned raw material slurry is a nickel oxide ore slurry, and the temperature and pressure of a leached slurry obtained by leaching said nickel oxide ore slurry with sulfuric acid is reduced to normal temperature and pressure.

Effects of Invention

In a method for operating a flash vessel according to the present invention, the present inventors have earnestly studied the control of the liquid level of the flash vessel in a high-pressure acid leaching process, the high-pressure acid leaching process being such that a raw material slurry is leached by using an autoclave under high temperature and high pressure and then the temperature and pressure of a leached slurry is reduced to normal temperature and pressure by using the flash vessel, and as a result, when a predetermined control liquid level of the slurry in the flash vessel is determined by a relation between the height from a slurry outlet to a control liquid level and the diameter of the flash vessel and a relation between the height from the control liquid level to the top of the flash vessel and the diameter of the flash vessel, whereby opening and closing valve is sufficiently controlled, thereby allowing troubles of a steam discharge pipe, a slurry discharge pipe, and a slurry discharge valve to be reduced, which is of great industrial value.

DETAILED DESCRIPTION OF THE INVENTION

Figure 1:
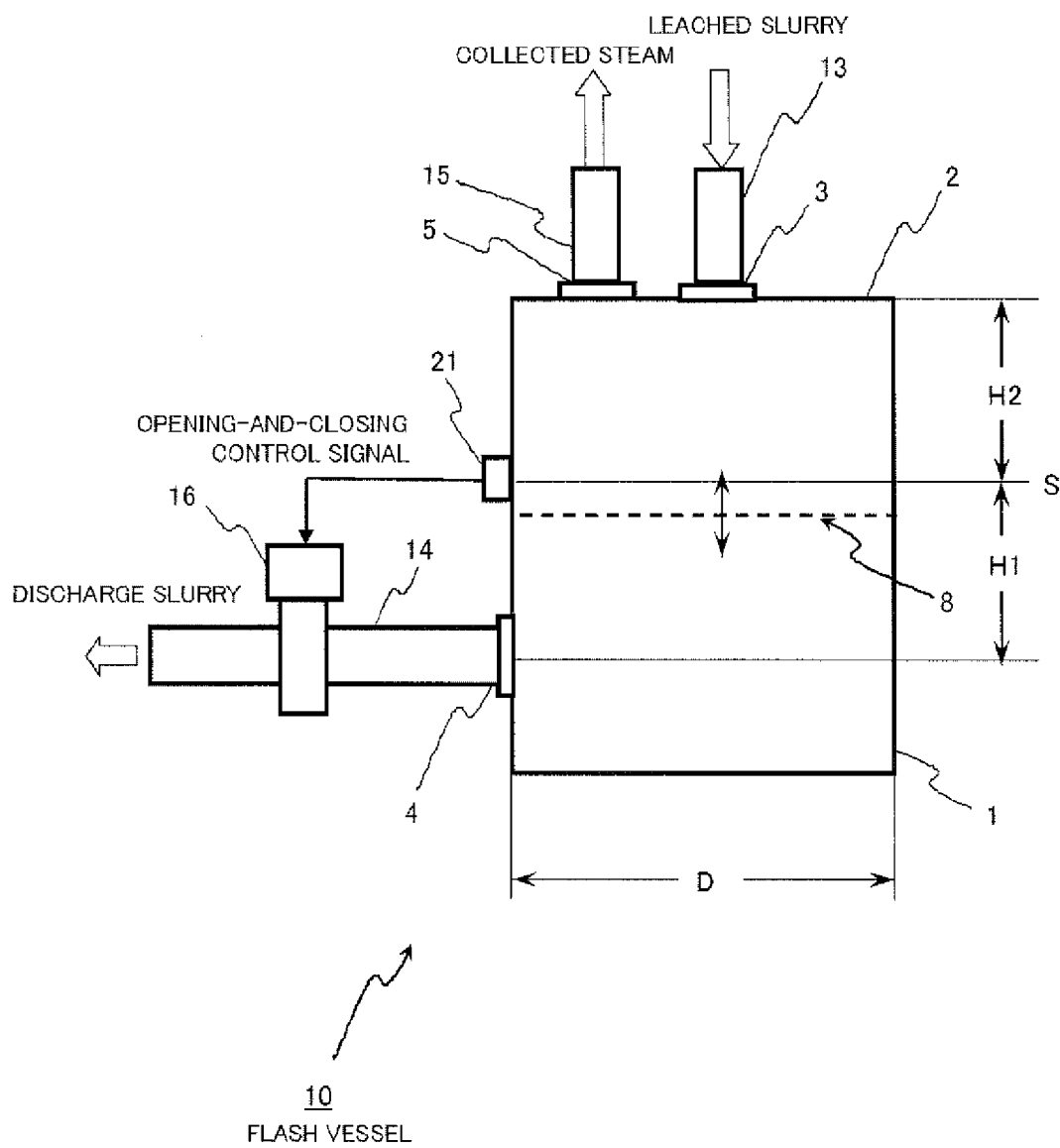
FIG. 1 illustrates one example of a method for operating a flash vessel to which the present invention is applied.

Hereinafter, embodiments of the present invention will be explained in detail with reference to the drawings.
The present invention is applied to, for example, a flash vessel 10 having a structure illustrated in FIG. 1.

This flash vessel 10 is used in a high-pressure acid leaching process wherein a raw material slurry is leached by using an autoclave under high temperature and high pressure and then the temperature and pressure of a leached slurry is reduced to normal temperature and pressure, and the flash vessel 10 comprises a body portion 1 in the form of a closed-bottom cylinder, a slurry inlet 3 and a steam outlet 5 are provided at a ceiling portion 2 which closes the open upper part of the body portion 1, and a shiny outlet 4 is provided at the body portion 1.

A slurry feeding pipe 13 configured to feed a leached slurry of which the temperature and pressure has been reduced to a predetermined temperature and a predetermined pressure, into the flash vessel 10 is coupled to the above-mentioned slurry inlet 3; a slurry discharge pipe 14 configured to discharge the slurry fed into said flash vessel 10 is coupled to the above-mentioned slurry outlet 4; and a steam discharge pipe 15 configured to recover steam which is generated inside said flash vessel 10 with the feeding of the slurry is coupled to the above-mentioned steam outlet 5. A slurry discharge valve 16 is attached to the slurry discharge pipe 14 coupled to the slurry outlet 4.

Furthermore, the leached slurry of which the temperature and pressure is reduced to a predetermined temperature and a predetermined pressure is fed into this flash vessel 10 via the slurry inlet 3, and the slurry fed into the flash vessel 10 is discharged from the slurry outlet 4, meanwhile steam which is generated with the feeding of the slurry is discharged from the steam outlet 5.

The flash vessel 10 further comprises at least one liquid level sensor 21 configured to detect a slurry liquid surface 8 at the control liquid level S, wherein, with H1 being the height from the slurry outlet 4 to the control liquid level S, H2 being the height from the control liquid level S to the top of the flash vessel, and D being the diameter of the flash vessel 10, $0.35D \leq H1 \leq 0.45D$, and
$0.75D \leq H2 \leq 0.85D$.

Furthermore, in the flash vessel 10, the valve opening degree of the above-mentioned slurry discharge valve 16 is controlled based on liquid level measurement results provided by the liquid level sensor 21, whereby a liquid in the flash vessel 10 is kept at a proper liquid level.

The flash vessel 10 is configured to be used in a high-pressure acid leaching process being such that a raw material slurry is leached by using an autoclave under high temperature and high pressure and then the temperature and pressure of a leached slurry is reduced to normal temperature and pressure, and the flash vessel is operated as follows.

That is, in this flash vessel 10, with H1 being the height from a slurry outlet 4 to a control liquid level S, H2 being the height from the control liquid level to the top of the flash vessel, and D being the diameter of the flash vessel 10, $0.35D \leq H1 \leq 0.45D$,
$0.75D \leq H2 \leq 0.85D$, and at least one liquid level sensor 21 detects a slurry liquid surface 8 at the control liquid level S; and when the liquid level sensor 21 detects a slurry liquid surface 8 which has risen, a slurry discharge valve 16 installed on a slurry discharge pipe 14 derived from the flash vessel 10 is opened, meanwhile, when the liquid level sensor 21 detects a slurry liquid surface 8 which has fallen, the slurry discharge valve 16 is closed.

Such operation allows a slurry liquid level in the flash vessel 10 to be controlled within a proper range. In other words, steam is less likely to flow into the slurry discharge pipe 14, whereby troubles such as damage to the slurry discharge valve 16 are reduced.

Here, a nickel oxide ore slurry is used as the raw material slurry, and a slurry resulting from leaching the nickel oxide ore slurry with sulfuric acid is fed into the flash vessel 10, and then the temperature and pressure of the slurry fed into is reduced to normal temperature and pressure by the flash vessel 10.

As mentioned above, in the flash vessel 10, the liquid level sensor 21 detects a slurry liquid surface 8 at the control liquid level S, and when the liquid level sensor 21 detects a slurry liquid surface 8 which has risen, a slurry discharge valve 16 installed on a slurry discharge pipe 14 derived from the flash vessel 10 is opened, meanwhile, when the liquid level sensor 21 detects a slurry liquid surface 8 which has fallen, the slurry discharge valve 16 is closed, and therefore a skilled operator capable of detecting a liquid level in the flash vessel 10 are not required for operation of the flash vessel.

The above-mentioned liquid level sensor 21 is not limited except that the liquid level sensor 21 transmits a proper detection signal, but it is preferable that the liquid level sensor 21 installed at the control liquid level S in the above-mentioned flash vessel 10 transmits to the slurry discharge valve 16 a signal to open a valve when a liquid surface which has risen is detected by the liquid level sensor 21, meanwhile the liquid level sensor 21 transmits to the slurry discharge valve 16 a signal to close a valve when a liquid surface which has fallen is detected by the liquid level sensor 21, whereby it becomes possible to automate the operation.

Furthermore, the above-mentioned raw material slurry is not particularly limited and examples thereof include a metallic-compound-containing raw material used for leaching a desired metal by high-pressure acid leaching, such as metal, sulfide, oxide, and ore, but a preferable example is an ore slurry comprising nickel oxide ore.

Furthermore, the above-mentioned high-pressure acid leaching process is not particularly limited, but include, besides the use of an autoclave and a flash vessel, the use of a preheater which gradually heats and pressurizes an ore slurry adopted for common high-pressure acid leaching.

Furthermore, the above-mentioned autoclave is not particularly limited, and a vertical or horizontal type pressurized container to be heated by external heating or by blowing of steam under pressure may be used as the autoclave. The above-mentioned flash vessel 10 is not limited, and a flash vessel having a multistage may be used. Furthermore, the above-mentioned preheater is not limited, and a direct heating type counterflow heat exchanger having a multistage may be used as the preheater. For the preheater, steam may be used as a heating medium. Here, as the steam, a steam generated by a common method, such as boiler, may be used, but it is preferable to recover, circulate, and utilize steam which is generated in the flash vessel for gradually reducing the temperature and pressure of a leached slurry discharged from an autoclave.

Hereinafter, there will be explained one example of high-pressure acid leaching of nickel oxide ores wherein the above-mentioned flash vessel 10 and its operating method are applied.

Figure 2:
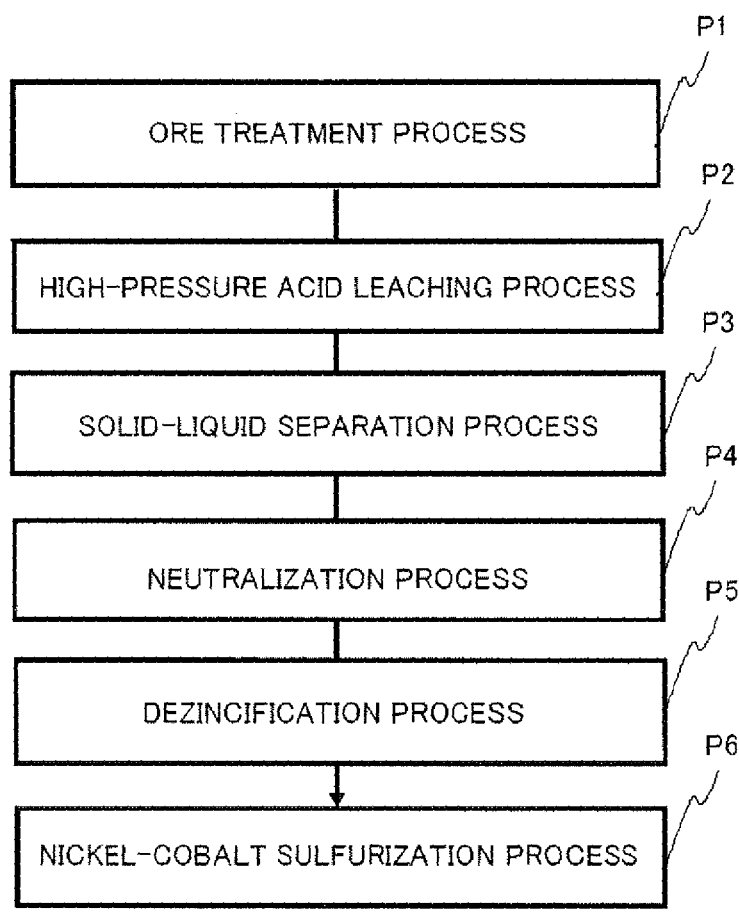
FIG. 2 is a flowchart showing a procedure for leaching nickel and cobalt by high-pressure acid leaching of nickel oxide ores.

As illustrated in FIG. 2, the above-mentioned high-pressure acid leaching of nickel oxide ores comprises an ore treatment process P1, a high-pressure acid leaching process P2, a solid-liquid separation process P3, a neutralization process P4, a dezincification process P5, and a nickel-cobalt sulfurization process P6.

In the ore treatment process P1, large masses, gangue minerals, tree roots, and the like are removed from a nickel oxide ore and an ore slurry having a predetermined slurry concentration is prepared.

In the subsequent high-pressure acid leaching process P2, the ore slurry transferred from the ore treatment process is preheated by a preheater; while high-pressure air and high-pressure steam being blown in by an autoclave, the preheated ore slurry is leached with sulfuric acid under high temperature and high pressure; and the temperature and pressure of the high temperature and pressure leached slurry are reduced by the above-mentioned flash vessel 10.

In the subsequent solid-liquid separation process P3, the above-mentioned leached slurry is solid-liquid separated into a leachate and a leaching residue.

In the subsequent neutralization process P4, a limestone slurry is added to the above-mentioned leachate to remove impurities such as iron and aluminum.

In the subsequent dezincification process P5, zinc and copper as impurities are removed as sulfide from the leachate by sulfurization precipitation.

Furthermore, in the nickel-cobalt sulfurization process P6, a nickel-cobalt mixed sulfide is obtained from the leachate by sulfurization precipitation.

As the nickel oxide ore, what is called laterite ore, such as limonite ore or saprolite ore is mainly used. The laterite ore usually has a nickel content of 0.5 to 2.0% by mass, and the nickel is contained as a hydroxide or a magnesium silicate mineral. Furthermore, the laterite ore has an iron content of 20 to 50% by mass, and the iron is mainly in the form of trivalent hydroxide (goethite, FeOOH), but, divalent iron is partially contained in the magnesium silicate mineral.

A slurry concentration of the ore slurry produced in the above-mentioned ore treatment process P1 is greatly affected by the properties of a nickel oxidation ore to be treated, and therefore not particularly limited, but a higher slurry concentration of the leached slurry is preferable and accordingly the slurry concentration thereof is usually adjusted to 20 to 50% by mass. In other words, a leached slurry having a slurry concentration of less than 20% by mass requires large equipment to achieve the same residence time in each of the processes including a leaching process, and also the amount of addition of acid is increased in order to adjust a residual acid concentration. Furthermore, a thus-obtained leachate has a lower nickel concentration, thereby filially causing reduction in actual yield. On the other hand, a leached slurry having a shiny concentration of over 50% by mass requires just small equipment, but the slurry itself has a high viscosity, thereby causing a problem that transfer thereof with a pump is difficult (such as frequent occurrence of blockages in a pipe and more energy requirement).

One example of practical equipment for the above-mentioned high-pressure acid leaching process P2 comprises, for example, a preheater with a three-stage type, an autoclave, and a flash vessel with a three-stage type.

Here, the flash vessel 10 has a size of approximately 4 to 6 m in diameter and approximately 10 to 12 m in height, has a cylindrical shape, and is vertically arranged. Furthermore, a slurry to be introduced into a first-stage flash vessel has a temperature of for example, 200 to 270 degrees C. and a pressure thereof, for example, 1.8 to 5.8 MPaG.

The flash vessel 10 to be used in the above-mentioned high-pressure acid leaching process P2 is operated, for example, as follows:

That is, the above-mentioned flash vessel 10 has a diameter D of 5.0 m; the height H1 from a slurry outlet 4 to a control liquid level S is 2.0 m, satisfying a condition of $0.35D \leq H1 \leq 0.45D$; and the height H2 from the control liquid level S to the top of the flash vessel is 4.0 m, satisfying a condition of $0.75D \leq H2 \leq 0.85D$.

Then, a liquid level sensor 21 detects a slurry liquid surface 8 at the control liquid level S, and when the liquid level sensor 21 detects a slurry liquid surface 8 which has risen, a slurry discharge valve 16 installed on a slurry discharge pipe 14 derived from the flash vessel 10 is opened, meanwhile, when the liquid level sensor 21 detects a slurry liquid surface 8 which has fallen, the slurry discharge valve 16 is closed.

The slurry is continuously fed into the flash vessel 10, and the liquid level sensor 21 detects a slurry liquid surface 8 at the above-mentioned control liquid level S, thereby controlling the opening and closing of the above-mentioned slurry discharge valve 16, whereby the flash vessel can be continuously operated.

EXAMPLES

Hereinafter, the present invention will be further explained in detail with reference to Example and Comparative Example of the present invention, but the present invention is not limited to these Examples. Analyses of the metal used in Example and Comparative Example were conducted by ICP spectrometry.

The following Table 1 shows analytical values of an ore slurry of nickel oxide ore used in Example and Comparative Example.

TABLE 1

| Solid Content | % by mass | 20-50 |
|---|---|---|
| Particle Diameter of Solids | mm | <2.0 |
| Ni | % by mass | 0.5-2.5 |
| Co | % by mass | 0.01-0.20 |
| Fe | % by mass | 20-50 |
| Si | % by mass | 3-15 |
| Mn | % by mass | 1-10 |
| pH | — | 4-6 |

Example 1

There was used a practical plant for nickel oxide ores, the plant including the above-mentioned practical equipment example for the high-pressure acid leaching process.

An operation was carried out for six months, the operation being such that, using an ore slurry shown in Table 1, a leached slurry was prepared to have a temperature of approximately 245 degrees C. and a pressure of approximately 4 MPaG at an outlet of an autoclave, and the leached slurry was fed into a first-stage flash vessel, and subsequently transferred to second-stage and third-stage flash vessels in order, whereby the temperature and pressure of the leached slimy was reduced to normal temperature and pressure.

As a result, troubles due to damage to a steam discharge pipe, a slurry discharge pipe, or a slurry discharge valve did not occur.

Comparative Example 1

The same operation as in Example 1 was performed, not by using the above-mentioned practical equipment example for the high-pressure acid leaching process, but by using a conventional equipment not comprising a hydrostatic tower.

As a result, approximately one trouble due to damage to a steam discharge pipe, a slurry discharge pipe, or a slurry discharge valve occurred per month, and every time the trouble occurred, repair work and equipment replacement were carried out, thereby causing a decrease in operating efficiency and an increase in equipment cost.

Here, the above-mentioned embodiment of a method for operating the flash vessel 10 is such that, with H1 being the height from a slurry outlet 4 to a control liquid level S, H2 being the height from the control liquid level S to the top of the flash vessel, and D being the diameter of the flash vessel, 0.35D≤H1≤0.45D,
0.75D≤H2≤0.85D, and one liquid level sensor 21 detects a slurry liquid surface 8 at the control liquid level S; and when the liquid level sensor 21 detects a slurry liquid surface 8 which has risen, a slurry discharge valve 16 installed on a slimy discharge pipe 14 derived from the flash vessel 10 is opened, meanwhile, when the liquid level sensor 21 detects a slurry liquid surface 8 which has fallen, the slurry discharge valve 16 is closed. However, there may be a method for operating for example the flash vessel 10A illustrated in FIG. 3, wherein liquid level sensors detect a slurry liquid surface 8 at the upper limit level of a slurry Ha and the lower limit level of a slurry Hb, respectively, the upper limit level of a slurry Ha being a level upper than the control liquid level S for example by 0.3 D to 0.4 D, the lower limit level of a slurry Hb being a level lower than the control liquid level S for example by 0.2 D to 0.3 D; and when the liquid level sensor 21A detects a slurry liquid surface 8 which has risen at the upper limit level of a slurry Ha, a slurry discharge valve 16 installed on a slurry discharge pipe 14 derived from the flash vessel 10 is opened, meanwhile, when the liquid level sensor 21B detects a slurry liquid surface 8 which has dropped at the lower limit level of a slurry Hb, the slurry discharge valve 16 is closed.

Figure 3:
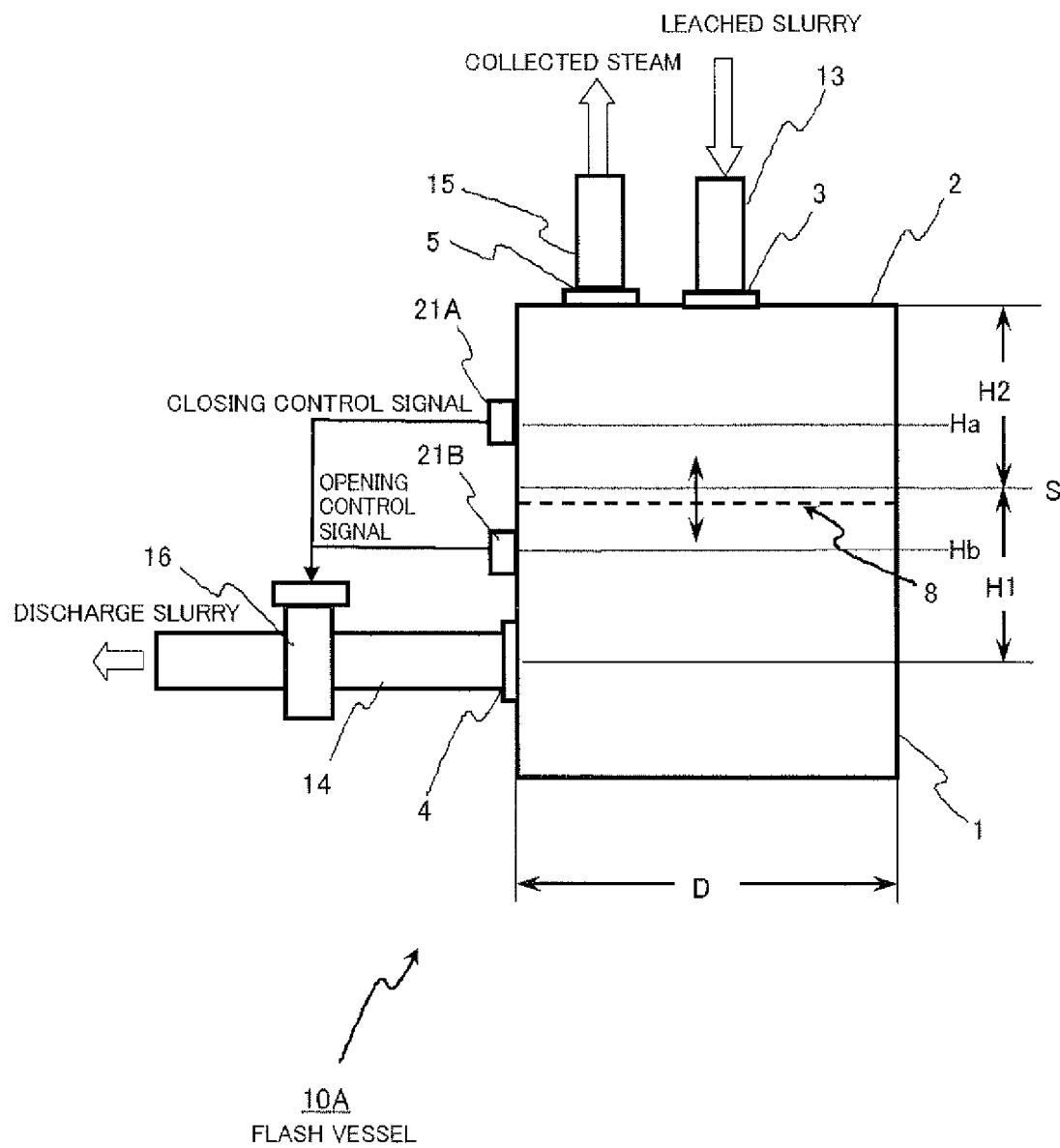
FIG. 3 illustrates other example of a method for operating a flash vessel to which the present invention is applied.

The flash vessel 10A illustrated in FIG. 3 is configured in such a manner that two liquid level sensors 21A and 21B are installed in the flash vessel 10 illustrated in FIG. 1, and accordingly the same components are assigned the same reference numerals and letters, and detailed description thereof will be omitted.

As mentioned above, the liquid level sensors 21A and 21B detect a slurry liquid surface 8 at the upper limit level of a slurry Ha provided at a position upper than the above-mentioned control liquid level S and the lower limit level of a slurry Hb provided at a position lower than the above-mentioned control liquid level S, respectively, thereby controlling the opening and closing of the above-mentioned slurry discharge valve 16, whereby a slurry liquid level in the flash vessel 1 OA can be stably controlled within an appropriate range.

Figure 4:
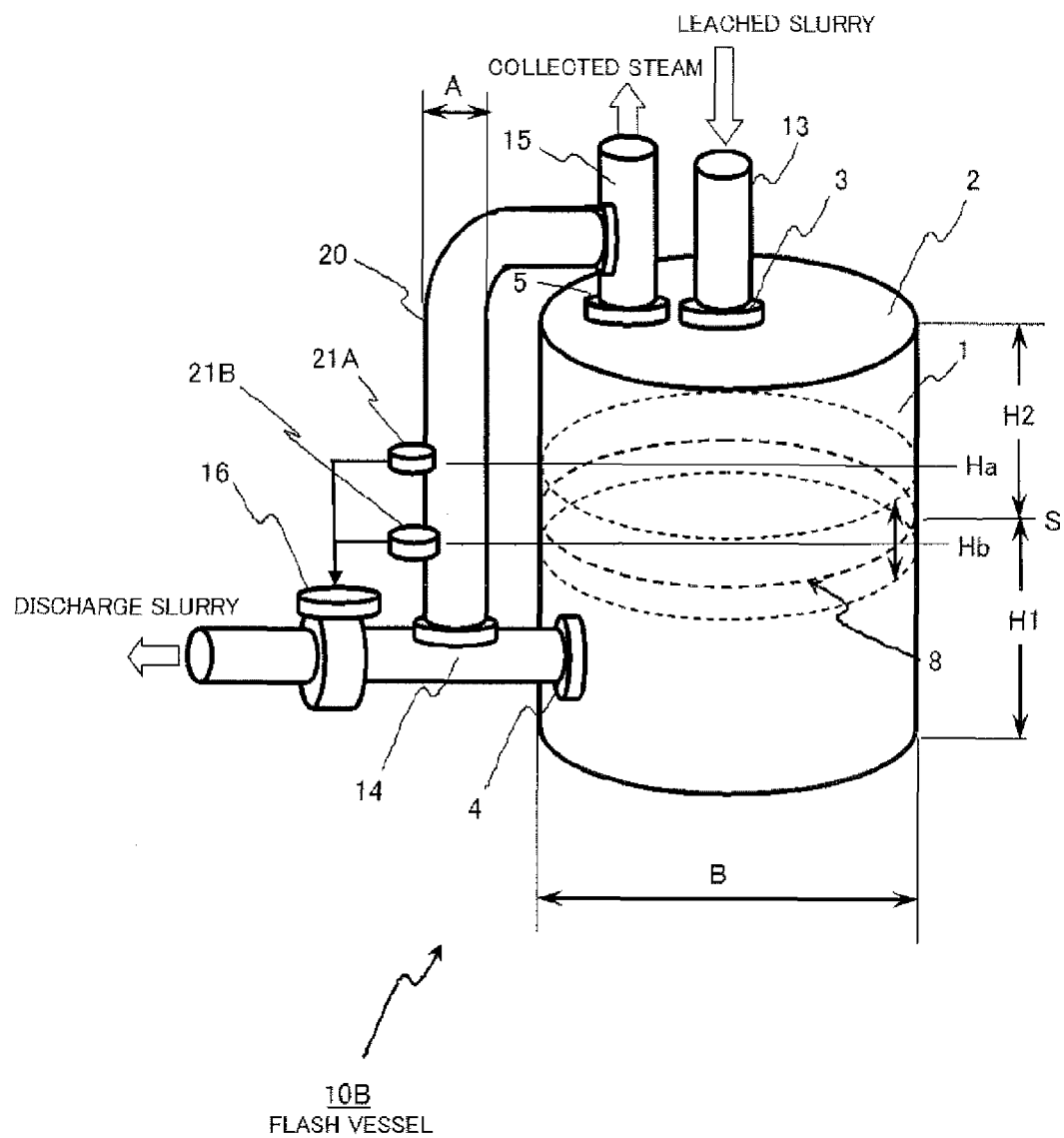
FIG. 4 illustrates other example of a method for operating a flash vessel to which the present invention is applied.
Figure 5:
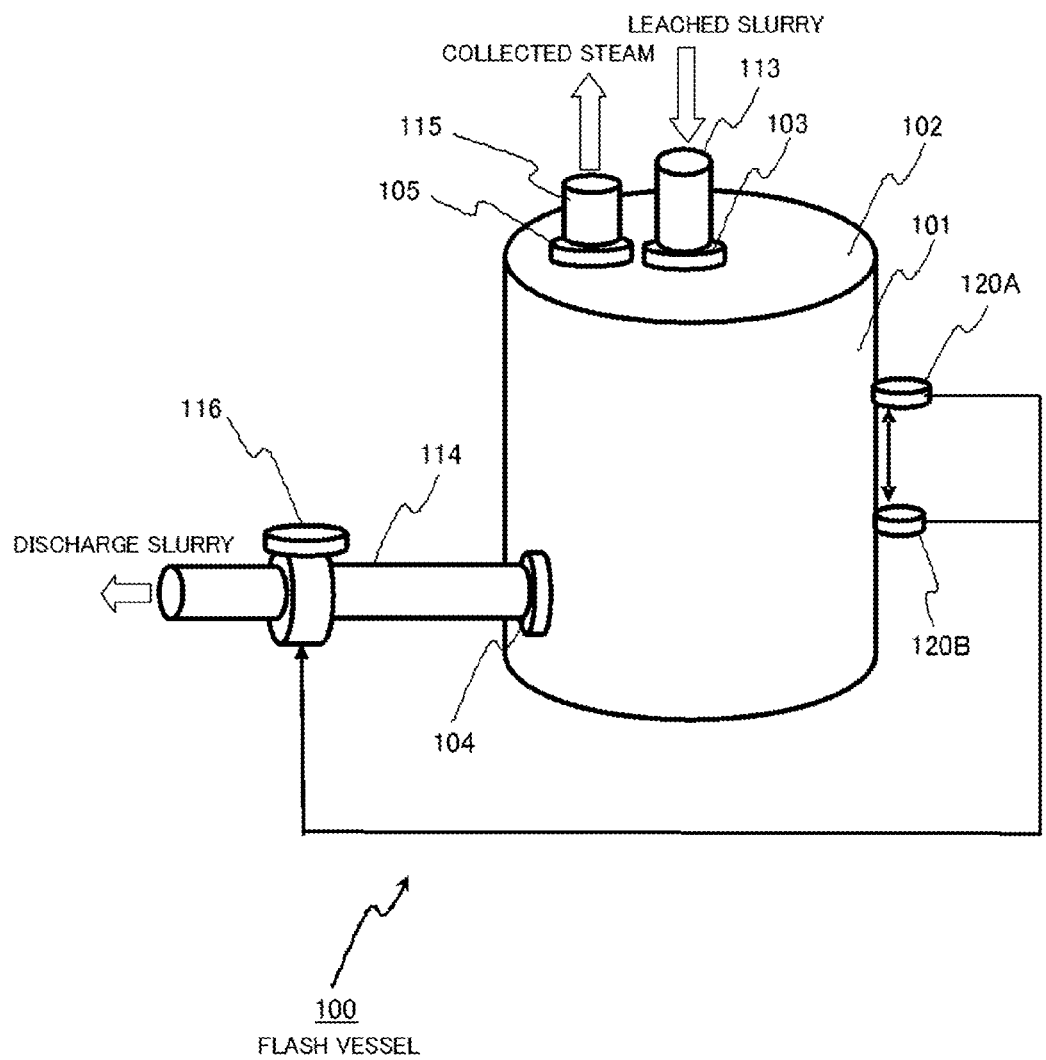
FIG. 5 illustrates a schematic structure of a common flash vessel.

Furthermore, there may be a method for operating the flash vessel 10B illustrated in FIG. 4, wherein at least one upper-limit liquid level sensor 21A installed at the equivalent level to the above-mentioned control liquid level S detects a liquid surface in a hydrostatic tower 20 whose lower part is communicated with a liquid phase space of said flash vessel 10B meanwhile whose upper part is communicated with a gas phase space thereof; and when the upper-limit liquid level sensor 21A detects a liquid surface which has risen in the hydrostatic tower 20, a slurry discharge valve 16 installed on a slurry discharge pipe derived from the flash vessel is opened, meanwhile, when the lower-limit liquid level sensor 21B detects a liquid surface which has fallen in the hydrostatic tower 20, the slurry discharge valve 16 is closed.

The flash vessel 10B illustrated in FIG. 4 is configured in such a manner that a hydrostatic tower 20 comprising two liquid level sensors 21A and 21B are provided in the flash vessel 10A illustrated in FIG. 3, and accordingly the same components are assigned the same reference numerals and letters, and detailed description thereof will be omitted.

In other words, the flash vessel 10B illustrated in FIG. 4 comprises a hydrostatic tower 20 whose lower part is communicated with a liquid phase space of said flash vessel 10B meanwhile whose upper part is communicated with a gas phase space thereof. The lower part of the above-mentioned hydrostatic tower 20 is coupled onto an arbitrary position of a slurry discharge pipe 14 between a coupling position of the slurry discharge pipe 14 to the flash vessel 10B and a slurry discharge valve 16, meanwhile the upper part of the above-mentioned hydrostatic tower 20 is coupled onto an arbitrary position of a steam discharge pipe 15.

For example, the lower part of a hydrostatic tower 20 having a diameter of 250 mm is coupled onto a slurry discharge pipe 14 at an intermediate position between a coupling position of the slurry discharge pipe 14 to the flash vessel 10B and a slurry discharge valve 16 (at a position approximately 50 cm distant from said coupling position), meanwhile the upper part of the above-mentioned hydrostatic tower 20 having a diameter of 250 mm is coupled onto a steam discharge pipe 15 at a position approximately 50 cm distant from a coupling position of the steam discharge pipe 15 to the flash vessel 10B. Furthermore, in the above-mentioned hydrostatic tower 20, an upper-limit liquid level sensor 21A is installed at the equivalent level to the above-mentioned upper limit level of a slurry Ha, meanwhile a lower-limit liquid level sensor 21B is installed at the equivalent level to the above-mentioned lower limit level of a slurry Hb. Furthermore, a diameter of 250 mm of the above-mentioned hydrostatic tower 20 is equal to one-twentieth of a diameter D, approximately 5 m, of a main body of the flash vessel 10B.

The diameter of the above-mentioned hydrostatic tower 20 is not particularly limited, but, when compared to a diameter B of a main body of the above-mentioned flash vessel 10B, a diameter A of the above-mentioned hydrostatic tower 20 is preferably within a range of 1/100×B≤A≤1/5×B. When the diameter A is too large, there is a risk of an increase in investment cost and the residence of a slurry in the hydrostatic tower 20, on the other hand, when the diameter A is too small, there are risks that violent fluctuation of a liquid level easily have an impact and that a pipe is easily blockaded by a slurry.

Furthermore, at least one upper-limit liquid level sensor 21A and at least one lower-limit liquid level sensor 21B are installed in the above-mentioned hydrostatic tower 20, the upper-limit liquid level sensor 21A being installed at a level equivalent to a predetermined upper-limit liquid level in the liquid phase space and detecting a liquid level which has risen in the hydrostatic tower 20, the lower-limit liquid level sensor 21B being installed at a level equivalent to a predetermined lower-limit liquid level in the liquid phase space and detecting a liquid level which has fallen in the hydrostatic tower 20.

In the flash vessel 10B, based on liquid level measurement results provided by the liquid level sensors 21A and 21B installed in the hydrostatic tower 20, the valve opening degree of the slurry discharge valve 16 is controlled, whereby a liquid in the flash vessel 10 is kept at a proper liquid level.

In other words, the flash vessel 10B is configured to be used in a high-pressure acid leaching process being such that a raw material shiny is leached by using an autoclave under high temperature and high pressure and then the temperature and pressure of a leached slurry is reduced to normal temperature and pressure, and said flash vessel is operated as follows.

That is, a slurry is continuously fed into the above-mentioned flash vessel 10B, and when the above-mentioned upper-limit liquid level sensor 21A detects a liquid surface which has risen in a state such that the slurry discharge valve 16 is closed, a signal to open the valve is transmitted to the slurry discharge valve 16 to open the slurry discharge valve 16, thereby transferring a slurry in the flash vessel 10B to a next process. Then, the discharge and transfer of the slurry in the flash vessel 10B to the next process causes a slurry liquid level in the flash vessel 10B to be lowered, and when the above-mentioned lower-limit liquid level sensor 21B detects a liquid surface which has fallen, a signal to close the discharge valve is transmitted to the slurry discharge valve 16 to close the slurry discharge valve 16, whereby a slurry liquid level in the flash vessel 10 begins to rise again. Repeating of this procedure allows continuous operation.

Such operation allows a slurry liquid level in the flash vessel 10B to be more stably controlled within a proper range, and steam is less likely to flow into the slurry discharge pipe 14, whereby troubles such as damage to the slurry discharge valve 16 are reduced.

REFERENCE SIGNS LIST

1 . . . body portion,
2 . . . ceiling portion,
3 . . . slurry inlet,
4 . . . slurry outlet,
5 . . . steam outlet,
8 . . . slurry liquid level,
10, 10A, 10B . . . flash vessel,
13 . . . slurry feeding pipe,
14 . . . slurry discharge pipe,
15 . . . steam discharge pipe,
16 . . . slurry discharge valve,
20 . . . hydrostatic tower,
21 . . . liquid level sensor,
21A . . . upper-limit liquid level sensor, and
21B . . . lower-limit liquid level sensor.

The invention claimed is:

1. A method for operating a flash vessel in a high-pressure acid leaching process, the high-pressure acid leaching process being such that a raw material slurry is leached by using an autoclave under high temperature and high pressure and then a temperature and pressure of a leached slurry is reduced to normal temperature and pressure by using the flash vessel,
  comprising H1 as a height from a slurry outlet to a control liquid level, H2 as a height from the control liquid level to a top of the flash vessel, and D as a diameter of the flash vessel,
  $0.35D \leq H1 \leq 0.45D$,
  $0.75D \leq H2 \leq 0.85D$,
  the slurry outlet being positioned on the side of the flash vessel,
  at least one liquid level sensor installed at an equivalent level to the control liquid level detects a slurry liquid surface in a hydrostatic tower having a lower part in fluid communication with a liquid phase space of the flash vessel, and an upper part in fluid communication with a gas phase space of the flash vessel, and
  wherein, when the liquid level sensor detects a slurry liquid surface which has risen in the hydrostatic tower, a slurry discharge valve installed on a slurry discharge pipe derived from the flash vessel is opened, meanwhile, when the liquid level sensor detects a slurry liquid surface which has fallen in the hydrostatic tower, the slurry discharge valve is closed.

2. The method for operating a flash vessel according to claim 1, wherein the above-mentioned raw material slurry is a nickel oxide ore slurry, and a temperature and pressure of a leached slurry obtained by leaching said nickel oxide ore slurry with sulfuric acid is reduced to normal temperature and pressure.

* * * * *